Dec. 5, 1950

J. K. SCHOUTEN

AERIAL SYSTEM

Filed July 12, 1946

2,533,054

JAN KAREL SCHOUTEN
INVENTOR.

BY [signature]

ATTORNEY.

Patented Dec. 5, 1950 2,533,054

UNITED STATES PATENT OFFICE 2,533,054

AERIAL SYSTEM

Jan Karel Schouten, Eindhoven, Netherlands, assignor to Hartford National Bank and Trust Company, Hartford, Conn., as trustee Application July 12, 1946, Serial No. 682,993
In the Netherlands June 21, 1943

Section 1, Public Law 690, August 8, 1946
Patent expires June 21, 1963

8 Claims. (Cl. 250—33.59)

The invention has for its object to provide an aerial system composed of dipoles and suitable for the transmission of a wide range of frequencies.

As is well-known, the input impedance of a dipole has a reactive component which varies in the neighbourhood of the resonance frequency to so high an extent that without taking particular steps, for example without the use of compensation networks, such an aerial is unsuitable for the transmission of a wide range of frequencies.

By taking a small ratio between the average diameter and the length of a dipole, which ratio will be briefly referred to hereinafter as "factor of slenderness," (for example conical or club-shaped dipoles) it is possible to counteract the above-mentioned drawback but even then the variation of the phase angle of the input impedance is still inadmissibly great for many purposes, for example for television transmission.

According to the invention, use is made of the coupling impedance of dipoles arranged in the neighbourhood of one another for the compensation of the reactive component of the input impedance of a dipole in the absence of other dipoles (this impedance being referred to hereinafter as "dipole impedance"). Compensation of the reactive component of the input impedance is effected in an aerial system comprising at least two parallel dipoles excited with the same intensity and with a phase difference of 0° or of 180° by making the mutual distance between the parallel dipoles such that the reactive components of dipole impedance and coupling impedance pass through zero at the same frequency (resonance frequency). The difference in excitation phase is so chosen that for frequencies located in the neighbourhood of the resonance frequency the said reactances exhibit opposite signs.

In this case the reactive components of the dipole and coupling impedances compensate, or at least partly compensate one another, for frequencies located in the neighbourhood of the resonance frequency so that the reactive component of the input impedance of each of the dipoles, which is given by the algebraic sum of the first-mentioned reactive components, has a low value.

It is possible in this case to obtain for a wide range of frequencies (about 10% of the resonance frequency), a substantially complete compensation of the reactive component of the dipole impedance by that of the coupling impedance owing to the proper choice of the slenderness of the dipoles.

The invention will be explained more fully with reference to the accompanying drawings.

Figures 1, 2, 3, 4A, 4B:
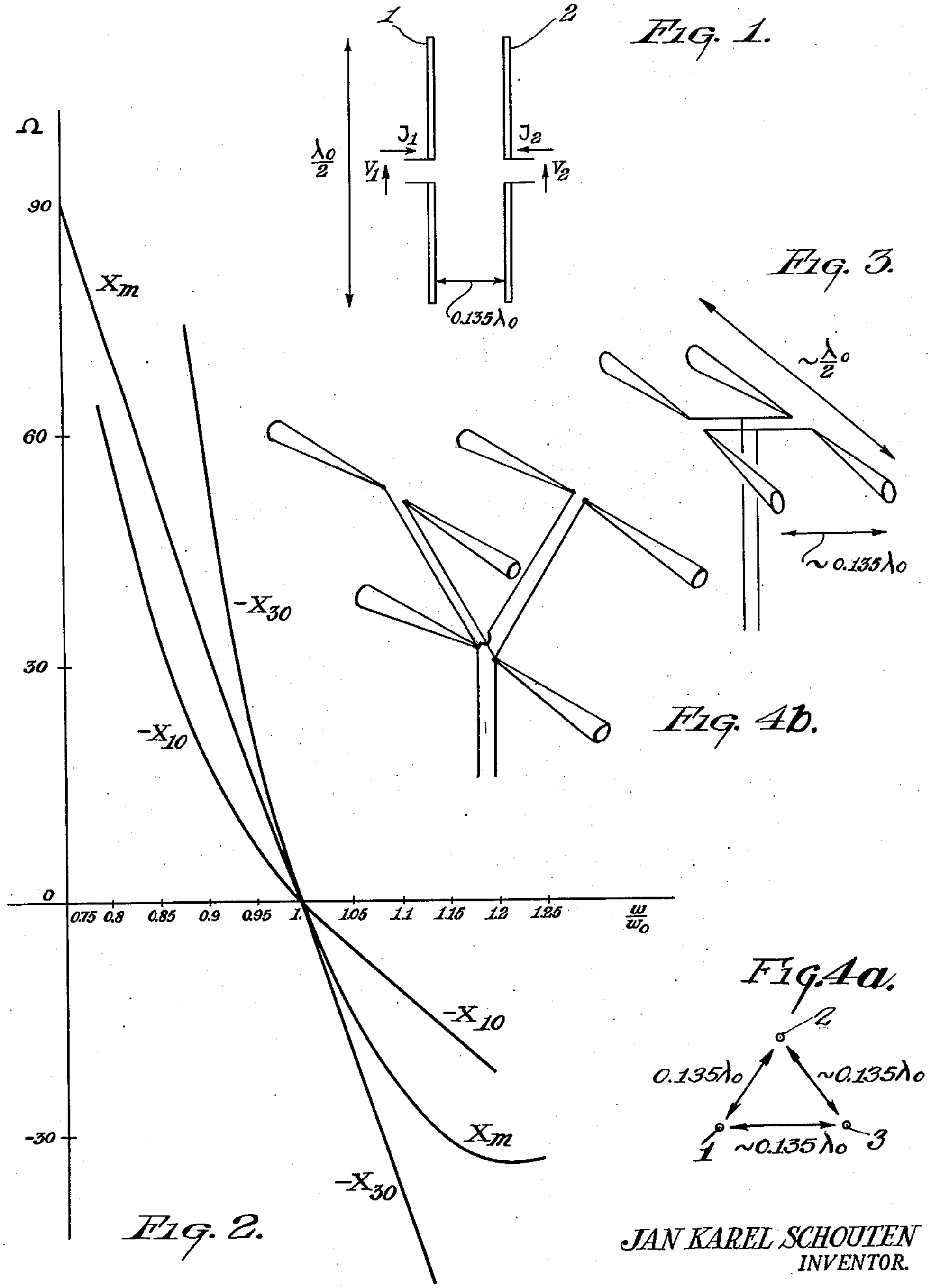
Figure 1 represents an aerial system according to the invention which comprises two dipoles.
Figure 2 shows a graph of the connection between the dipole and coupling reactances on the one hand and the excitation frequency on the other hand.
Figure 3 shows a particularly advantageous form of construction of an aerial system according to the invention which comprises two dipoles whilst, Figures 4*a* and *b* represent schematically and structurally an aerial system according to the invention with three dipoles.

To the aerial system shown in Figure 1, which comprises two equal and coupled dipoles 1 and 2 the length of each of which corresponds to half the resonance wavelength, apply the following relations:

$$V_1 = I_1.Z_{11} + I_2.Z_m \text{ and } V_2 = I_2.Z_{22} + I_1.Z_m$$

or $$\frac{V_1}{I_1} = Z_1 = Z_{11} + \frac{I_2}{I_1}.Z_m$$

and $$\frac{V_2}{I_2} = Z_2 = Z_{22} + \frac{I_1}{I_2}.Z_m$$

wherein:

$V_1$=the voltage applied to the input of dipole 1
$V_2$=the voltage applied to the input of dipole 2
$I_1$=the current flowing through dipole 1
$I_2$=the current flowing through dipole 2
$Z_{11} = R_{11} + jX_{11}$=the impedance of the dipole 1 in the absence of other dipoles or represents the dipole impedance of this dipole
$Z_{22} = R_{22} + jX_{22}$=the dipole impedance of the dipole 2
$Z_m = R_m + jX_m$=the coupling impedance of the dipoles 1 and 2
$Z_1$=the input impedance of the dipole 1
$Z_2$=the input impedance of the dipole 2

If the two dipoles are excited with the same intensity and in phase or in anti-phase, we have on account of the equality of the dipoles:

$$V_1 = \pm V_2 \text{ and } I_1 = \pm I_2;\ Z_{11} = Z_{22} = Z = R + jX$$
$$Z_1 = Z_2 = Z + Z_m = R \pm R_m + j(X \pm X_m)$$

By taking, in accordance with the invention, a proper distance between the dipoles it can be ensured, as may be seen from the graph in Figure 2, that the curve $X_m$, which represents the reactive component of the coupling impedance as a function of the quotient of the excitation and resonance frequencies, $\omega$ and $\omega$ respectively, of the dipoles, passes through zero at the resonance frequency. With dipoles excited in phase this is achieved if the mutual distance approximately amounts to $0.135\lambda_0$ where $\lambda_0$ represents the wavelength corresponding to the resonance frequency of the dipole and, with dipoles excited in antiphase, if the mutual distance approximately amounts to $0.68\lambda_0$. It may be observed in this connection that in the latter case one of the two dipoles may be formed by the image dipole of the other dipole arranged in front of the wall of a reflector. In the case of slight variations of the mutual distance between the dipoles the curve $X_m$ is displaced in the graph essentially parallel to itself in the direction of the frequency axis.

By taking the distance between the dipoles as mentioned above, it is achieved that for the resonance frequency the reactive component of the input impedance $Z_1$ and $Z_2$ respectively of each of the dipoles disappears since in this case also the reactive components of the aerial impedance Z of the dipoles are equal to zero.

For frequencies located in the neighborhood of the resonance frequency the above-mentioned choice of the distance and of the excitation phase affords an appreciable reduction of the reactive component of the input impedance of the dipoles since in this case the reactive components of the dipole and coupling impedances, X and $X_m$ respectively, compensate or at least partly compensate one another owing to their opposite signs.

Substantially complete compensation can be obtained by making use of the fact that the slope of the curve which represents the reactive component of the dipole impedance as a function of frequency, varies with the factor of slenderness of the dipoles, but that the coupling impedance is in first approximation independent of the factor of slenderness.

In the graph of Figure 2 the variation of the reactive component of the dipole impedance X of dipoles excited in phase and arranged at a mutual distance of about $0.135\lambda_0$ for two different factors of slenderness, viz. 10 and 30, is indicated by $X_{10}$ and $X_{30}$. For the sake of clearness the negative values of these components are given, i. e. $(-X_{10})$ and $(-X_{30})$. As appears therefrom it is possible in the case supposed to obtain substantially complete compensation of the reactive components for a wide range of frequencies by taking a factor of slenderness of approximately 20. The optimum value is preferably determined experimentally.

In the form of construction represented by way of example in Figure 1 the dipoles have a cylindrical shape. The invention may, however, also be applied to dipoles of other configuration; for example, they may be given the shape of clubs or cones, as shown in Figure 3, which may be desirable in connection with the adaptation to the transmission line or in view of the directional characteristic. Also in these forms of construction the slope of the curve X depends upon the factor of slenderness.

With the use of more than two dipoles in the aerial system these dipoles are arranged, in order to make all of them equivalent, according to the angular points of a regular polygon, in the case of three dipoles 1, 2 and 3 as shown in Figures 4*a* and 4*b*, i. e. according to the angular points of an equilateral triangle whose sides have a length of approximately $0.135\lambda_0$. Since now, however, for each of the dipoles the coupling impedance is doubled, the factor of slenderness must be taken considerably larger, viz. approximately 200, in order to obtain complete compensation of the reactive components. With more than three dipoles the mutual distances between them can naturally no longer be the same, but also in this case it is possible to ensure that for the resonance frequency the total coupling impedance operative for each dipole is equal to zero. For this purpose the side of the regular polygon in the angular points of which the dipoles are arranged, is taken slightly smaller than $0.135\lambda_0$ and this in such manner that now for the resonance frequency the reactive components of the separate coupling impedances caused each time by one of the dipoles differ from zero. For each of the dipoles the dipoles arranged "too near" and those arranged "too far" cause coupling reactances of opposite signs whose values vary with the length of the side of the regular polygon. By the proper choice of the length of the side it is possible to obtain mutual compensation of the reactive components of the separate coupling impedances for the resonance frequency.

It may finally be observed that the invention may also be applied to aerial systems wherein the dipole length differs from half the resonance wavelength if only the dipoles are again in resonance and consequently the length of the dipole is a multiple of a quarter of the operating wavelength. In the choice of the mutual distance between the dipoles this must be taken into account in connection with the dependence of the coupling impedance upon the relative dipole length.

What I claim is:

1. A broad band high-frequency aerial system comprising at least two like dipoles disposed in spaced relation, each of said dipoles being characterized by a dipole input impedance which in the absence of the other dipole has a reactive component, each dipole being further characterized by a coupling impedance depending on the mutual coupling between the two dipoles, and means to excite said dipoles with the same intensity and with a predetermined phase displacement, the distance between said dipoles having a value at which the reactive components of the dipole impedance and the coupling impedance are both equal to zero at the resonance frequency of said dipoles, said phase displacement having a value at which for the frequencies located in the vicinity of the resonance frequency said reactances exhibit opposite signs.

2. An aerial system as set forth in claim 1 wherein said phase displacement is zero degrees.

3. An aerial system as set forth in claim 1 wherein said phase displacement is 180 degrees.

4. A broad band high-frequency aerial system comprising at least two like dipoles each having a length corresponding to half the resonance wavelength of said dipoles, said dipoles being disposed in parallel relation, means to excite said dipoles with the same intensity and in phase coincidence, the distance between said dipoles being substantially equal to 0.135 of the resonance wavelength.

5. A broad band high-frequency aerial system comprising at least two like dipoles each having a length corresponding to half the resonance wavelength of said dipoles, each dipole being defined by a pair of conical radiators having a predetermined ratio between the length of the radiators and the average diameter thereof, said dipoles being disposed in parallel relation, means to excite said dipoles with the same intensity and with a predetermined phase displacement, the distance between said dipoles having a value at which the reactive components of the dipole impedance and the coupling impedance are both equal to zero at the resonance frequency of said dipoles, said phase displacement having a value at which for the frequencies located in the vicinity of the resonance frequency said reactances exhibit opposite signs, said predetermined ratio having a value at which for the frequencies located in the vicinity of the resonance frequency said reactances have equal absolute values.

6. A broad band high-frequency aerial system comprising at least two like dipoles each having a length corresponding to half the resonance wavelength of said dipoles, said dipoles being disposed in parallel relation with a separation equal to substantially 0.135 of the resonance wavelength, each of said dipoles being defined by a pair of conical radiators having a ratio of 20:1 between the length of the radiators and the average diameter thereof of approximately 20.

7. A broad band high-frequency aerial system comprising three like dipoles disposed in spaced relation at the angular points of an equilateral triangle, each of said three dipoles being characterized by a dipole input impedance which in the absence of the other dipoles has a reactive component, each dipole being further characterized by a coupling impedance depending on the mutual coupling between the three dipoles, and means to excite said dipoles with the same intensity and with a predetermined phase displacement, the distance between said points having a value at which the reactive components of the dipole impedance and the coupling impedance are both equal to zero at the resonance frequency of said dipoles, said phase displacement having a value at which for the frequencies located in the vicinity of the resonance frequency said reactive components exhibit opposite signs.

8. An aerial system, as set forth in claim 7, wherein each of said dipoles is defined by a pair of conical radiators having a ratio of 200:1 between the length of the radiators and the average diameter thereof.

JAN KAREL SCHOUTEN.

REFERENCES CITED

The following references are of record in the file of this patent:

UNITED STATES PATENTS

| Number | Name | Date |
|---|---|---|
| 2,175,254 | Carter | Oct. 10, 1939 |
| 2,183,784 | Carter | Dec. 19, 1939 |

OTHER REFERENCES

Radio Engineering By Terman, 2nd ed., 1937, pp. 664 and 692.

Certificate of Correction

Patent No. 2,533,054 December 5, 1950

JAN KAREL SCHOUTEN

It is hereby certified that error appears in the printed specification of the above numbered patent requiring correction as follows:

Column 5, line 25, strike out "of approximately 20";

and that the said Letters Patent should be read as corrected above, so that the same may conform to the record of the case in the Patent Office.

Signed and sealed this 3rd day of April, A. D. 1951.

[SEAL]

THOMAS F. MURPHY,
*Assistant Commissioner of Patents.*